(12) United States Patent
Terajima

(10) Patent No.: US 9,348,108 B2
(45) Date of Patent: May 24, 2016

(54) LENS DRIVING DEVICE

(71) Applicants: Huizhou Dayawan Ever Bright Electronic Industry Co., Ltd., Huizhou (CN); JSS Optical Technology Co., Ltd., Hong Kong (HK); Huizhou Daya Bay Jss Optical Technology.Co., Ltd., Huizhou (CN)

(72) Inventor: Kokichi Terajima, Tokyo (JP)

(73) Assignees: HUIZHOU DAYAWAN EVER BRIGHT ELECTRONIC INDUSTRY CO, Huizhou (CN); JSS OPTICAL TECHNOLOGY CO., LTD., Hong Kong (HK); HUIZHOU DAYA BAY JSS OPTICAL TECHNOLOGY. CO., LTD., Huizhou (CN)

( * ) Notice: Subject to any disclaimer, the term of this patent is extended or adjusted under 35 U.S.C. 154(b) by 0 days.

(21) Appl. No.: 14/620,229

(22) Filed: Feb. 12, 2015

(65) Prior Publication Data

US 2015/0268442 A1    Sep. 24, 2015

(30) Foreign Application Priority Data

Mar. 20, 2014    (JP) ................................. 2014-058904

(51) Int. Cl.
*G02B 7/02*    (2006.01)
*G02B 7/09*    (2006.01)
*G03B 3/10*    (2006.01)
*G02B 7/04*    (2006.01)

(52) U.S. Cl.
CPC .. *G02B 7/09* (2013.01); *G02B 7/04* (2013.01); *G03B 3/10* (2013.01); *G02B 7/026* (2013.01)

(58) Field of Classification Search
CPC .................. G06K 2207/1016; G06K 7/10653; G02B 7/04; G02B 7/09; G11B 7/0925; G11B 7/0927
USPC .................................................. 359/819–830
See application file for complete search history.

(56) References Cited

U.S. PATENT DOCUMENTS 5,107,485 A * 4/1992 Chandler ............. G11B 7/0927
                                                    369/44.21
8,605,372 B2 * 12/2013 Yu ........................ G02B 27/646
                                                    359/813

* cited by examiner

*Primary Examiner* — Mahidere Sahle
(74) *Attorney, Agent, or Firm* — Hemisphere Law, PLLC

(57) ABSTRACT

The present invention aims to provide a lens driving device which can prevent a lens support from being suspended in an inclined state and can correspond to energizing amount and carry out appropriate linear movement action. A front side primary coil and a rear side primary coil are respectively wound around an axis parallel to an optical axis in a manner of being coaxial to a secondary coil and are combined with each other through electromagnetic induction. The secondary coil is such disposed that its two coil terminals are connected with two ends of a diode respectively. The secondary coil and a permanent magnet assembly are arranged opposite to each other at an interval along the radial direction and a driving current is supplied to the primary coils.

4 Claims, 6 Drawing Sheets

LENS DRIVING DEVICE

BACKGROUND OF THE INVENTION

1. Field of the Invention

The present invention relates to a lens driving device mounted in the camera of a mobile phone, in particular to a lens driving device with an automatic focusing function and capable of enabling a lens to move in the direction of an optical axis.

2. Description of Related Art

FIG. 5 illustrates a section view illustrating a lens driving device 20 based on a representative existing electromagnetic driving mechanism disclosed by Patent Document 1 (JP 2004-280031), FIG. 6A is an exploded view, and FIG. 6B is an enlarged view of a main part of the lens driving device.

As shown in each figure, the lens driving device 20 includes a box body 21, a lens support 22, a magnet yoke 23, a coil 24, a permanent magnet assembly 25, a front side spring component 26A and a rear side spring component 26B. When the direction of the optical axis of an unshown lens is taken as a direction of Z axis, the lens support 22 of the lens driving device 20 for retaining the lens can move along the direction of Z axis.

The magnet yoke 23 is made of soft magnetic material, and includes an outer peripheral wall 23a, an inner peripheral wall 23b and a top wall part 23c for connecting the outer peripheral wall 23a with the inner peripheral wall 23b together at the +Z side. The magnet yoke 23 has an approximately n-shaped transverse cross section, and is mounted in the box body 21. The permanent magnet assembly 25 is circular arc column-shaped, and includes several circular arc magnets arranged in a circular column. The circular arc magnets are cylindrically mounted on the inner side of the outer peripheral wall 23a of the magnet yoke 23.

The coil 24 is wound around an axis parallel to the Z axis, and disposed between the permanent magnet assembly 25 and the inner peripheral wall 23b of the magnet yoke 23. That is, the coil 24, the permanent magnet assembly 25 and the inner peripheral wall 23b are encircled one inside another in the radial direction, and are respectively separated at an interval. The coil 24 is fixed on the +Z side face of a flange part 22a of the lens support 22. The flange part 22a of the lens support 22 enters the −Z side of the inner peripheral wall 23b of the magnet yoke 23. The coil 24 can move along the direction of Z axis in a space defined by the inner peripheral wall 23b, the top wall part 23c of the magnet yoke 23 and the permanent magnet assembly 25.

The box body 21 includes four outer side support columns 21a vertically arranged on the outer side of the outer peripheral wall 23a of the magnet yoke 23 and a base part 21b positioned at the rear (on the −Z side) of the lens support 22. The magnet yoke 23 is fixed on the +Z side of the base part 21b of the box body 21.

The lens support 22 is formed to be in the shape of a cylinder capable of accommodating the unshown lens inside. The lens support 22 is mounted to be capable of freely moving along the optical axis on the inner peripheral side of the magnet yoke 23.

The front side spring component 26A and the rear side spring component 26B are both plate springs made of alloy materials with good electrical conductivity. The front side spring component 26A is formed to be annular, and is disposed in the front (on the +Z side) of the lens support 22 in the direction of the optical axis. The rear side spring component 26B includes a +Y side circular arc spring component 26C and a −Y side circular arc spring component 26D which are circular arc shapes and form a circle together, and is disposed at the rear (on the −Z side) of the lens support 22 in the direction of the optical axis.

Each of the front side spring component 26A and the rear side spring component 26B includes an inner side retaining part 26a connected with the side of the lens support 22, an outer side retaining part 26b connected with the side of the box body 21, a plurality of wrist parts 26c disposed between the inner side retaining part 26a and the outer side retaining part 26b and extending along the circumference direction, a plurality of inner side connecting parts 26m for connecting the inner side retaining part 26a with one ends of the wrist parts 26c, and a plurality of outer side connecting parts 26n for connecting the outer side retaining part 26b with the other ends of the wrist parts 26c.

Moreover, the rear side spring component 26B is provided with two power supply terminals 26d connected with an external power supply as a power supply path.

The inner side retaining part 26a of the front side spring component 26A is connected with the connecting surface 22c on the +Z side of the lens support 22. The inner side retaining part 26a of the rear side spring component 26B is connected onto −Z side face of the flange part 22a of the lens support 22.

The outer side retaining part 26b of the front side spring component 26A is connected onto the +Z side face of the top wall part 23c of the magnet yoke 23. The outer side retaining part 26b of the rear side spring component 26B is connected onto the +Z side face of the base part 21b of the box body 21.

The end part 22b on the −Z side of the lens support 22 abuts against the base part 21b of the box body 21. By taking the (offset) states of the inner side retaining parts 26a of the front side spring component 26A and the rear side spring component 26B closer to the +Z side than the outer side retaining parts 26b of the front side spring component 26A and the rear side spring component 26B as initial positions, the front side spring component 26A and the rear side spring component 26B are respectively subjected to application force in the −Z direction by restoring force generated by the wrist parts 26c of the front side spring component 26A and the rear side spring component 26B.

The winding terminal 24a of the coil 24 is connected with the inner side retaining part 26a of the +Y side circular arc spring component 26C through tin soldering or spot welding. Moreover, the winding terminal 24b of the coil 24 is connected with the inner side retaining part 26a of the −Y side circular arc spring component 26D through tin soldering or spot welding.

Thus, the lens support 22 of the lens driving device 20 is subjected to acting force in the direction of −Z axis applied by restoring force generated by the wrist parts 26c of the front side spring component 26A and the rear side spring component 26B. Moreover, when the power supply terminals 26d are powered, and a current is flowing in the coil 24, a driving force is generated in the direction of +Z axis and is greater than the restoring force of the wrist parts 26c, the end part 22b on the −Z side of the lens support 22 leaves away from the base part 21b and floats up in the +Z direction.

As shown in FIG. 6B, under the condition that the winding terminals 24a, 24b of the coil 24 are connected to the inner side retaining part 26a of the rear side spring component 26B through tin soldering, tin soldering fluxes 27 contained in a tin soldering material are scattered towards the tin soldering part and are attached onto peripheral components (the lens support 22, the rear side spring component 26B and the like), or annealing can be generated for the rear side spring component 26B heated by tin soldering iron or spot welding.

Thus, when the tin soldering fluxes 27 are attached onto the lens support 22 or the rear side spring component 26B, the tin soldering fluxes can also exist in a gap between the lens support 22 and the rear side spring component 26B, a gap between the lens support 22 and the base part 21b of the box body 21, a gap between the rear side spring component 26B and the base part 21b, and the like. In such condition, even if the coil 24 is electrified, the lens support 22 may be adhered by the tin soldering fluxes and resist to Lorentz force generated by the electrified coil 24, and keeps still all the time and cannot move to a distance corresponding to the energizing amount. On the other hand, the lens support 22 may suddenly move possibly due to sudden falling of the soldering fluxes 27 so as to cause movement disorders, and the lens support 22 can not generate linear movement corresponding to power supply either.

Moreover, under the condition that the inner side retaining part 26a of the rear side spring component 26B is subjected to pressing force applied by a soldering iron sharp or a welding head of the tin soldering iron, the rear side spring component 26B may be deformed plastically sometimes. Specifically, when the pressing force generated by the soldering iron sharp of the tin soldering iron or the welding head through spot welding is applied to the inner side retaining part 26a, the rear side spring component 26B is plastically deformed, and the lens support 22 is possibly suspended at an inclined state. And then, when the rear side spring component 26B is heated by the tin soldering iron or the welding head for annealing, the elastic force of the rear side spring component 26B changes to cause that the spring coefficient of the spring component 26 changes, but that the action sensitiveness at that time may be offset with a preset value is also taken into consideration.

BRIEF SUMMARY OF THE INVENTION

The object of the present invention is to provide a lens driving device, in the lens driving device, a lens support is not suspended at an inclined state, and linear movement action can be appropriately carried out based on the energizing amount.

The lens driving device of the present invention includes a lens support for retaining a lens, a box body for accommodating the lens support, a spring component for supporting the lens support in the box body in a suspension mode and moving in a direction of an optical axis of the lens, one or two primary coils wound around the optical axis and mounted on the inner side of the box body, a secondary coil coaxial to the one or two primary coils and wound around the optical axis and mounted on an outer peripheral side of the lens support, a permanent magnet or a permanent magnet assembly arranged on the inner side of the box body and arranged opposite to the secondary coil at an interval along a radial direction of the lens, and a diode with its two ends connected with two coil terminals of the secondary coil respectively. Electromagnetic induction is generated along with the supply of a driving current to the one or two primary coils, so that a secondary current is generated by the secondary coil. The diode serially connected in the secondary coil enables the secondary current to flow in a preset direction.

Thus, only a current flowing to the primary coil is taken as the primary supply current of the driving current, the secondary current generated in the secondary coil subjected to induction power supply flows to the positive direction of the diode, thus, even if the winding terminals of the secondary coil mounted on the lens support on the movable side are not connected to the side of the external power supply, the secondary coil can also generate Lorentz force enabling the lens support to move in the direction of the optical axis, and thus the winding terminals of the secondary coil need not be connected with the spring component through tin soldering spot welding, the spring component does not need to be taken as the power supply path, either.

As a result, the tin soldering flux generated during the tin soldering process can be effectively prevented from infiltrating into the lens support, the spring component and the box body to cause non-linear movement of the lens support, or the spring component is prevented from degrading along with heating to cause the spring coefficient changes, or the spring component is prevented from being deformed plastically along with the pressing of the tin soldering iron tip or the spot welding head to cause that the lens support is suspended at an inclined state, and the lens support suspended in an appropriate posture can linearly move appropriately in the direction of the optical axis.

As an embodiment, the one or two primary coils and the secondary coil are arranged opposite to each other at an interval along the direction of the optical axis.

Thus, the primary coil(s) and the secondary coil are arranged opposite to each other along the direction of the optical axis, and thus the secondary current of the secondary coil can be effectively generated, and the lens support can efficiently move in the direction of the optical axis.

As another embodiment, the primary coil(s) and the secondary coil are arranged opposite to each other at an interval along the radial direction.

Thus, the primary coil and the secondary coil are arranged opposite to each other along the radial direction, and thus the secondary current of the secondary coil can be effectively generated, and the lens support can efficiently move in the direction of the optical axis.

BRIEF DESCRIPTION OF THE SEVERAL VIEWS OF THE DRAWING(S)

The foregoing and other exemplary purposes, aspects and advantages of the present invention will be better understood in principle from the following detailed description of one or more exemplary embodiments of the invention with reference to the drawings, in which:

FIG. 1A is an exploded view and FIG. 1B is a perspective cross-sectional view illustrating a lens driving device in according to a first embodiment of the present invention;

FIG. 2A, FIG. 2B, and FIG. 2C are circuit diagrams illustrating the wiring of two primary coils and a secondary coil of the lens driving device in the first embodiment of the present invention;

DETAILED DESCRIPTION OF THE INVENTION

The invention will now be described in detail through several embodiments with reference to the accompanying drawings.

Figure 1A:
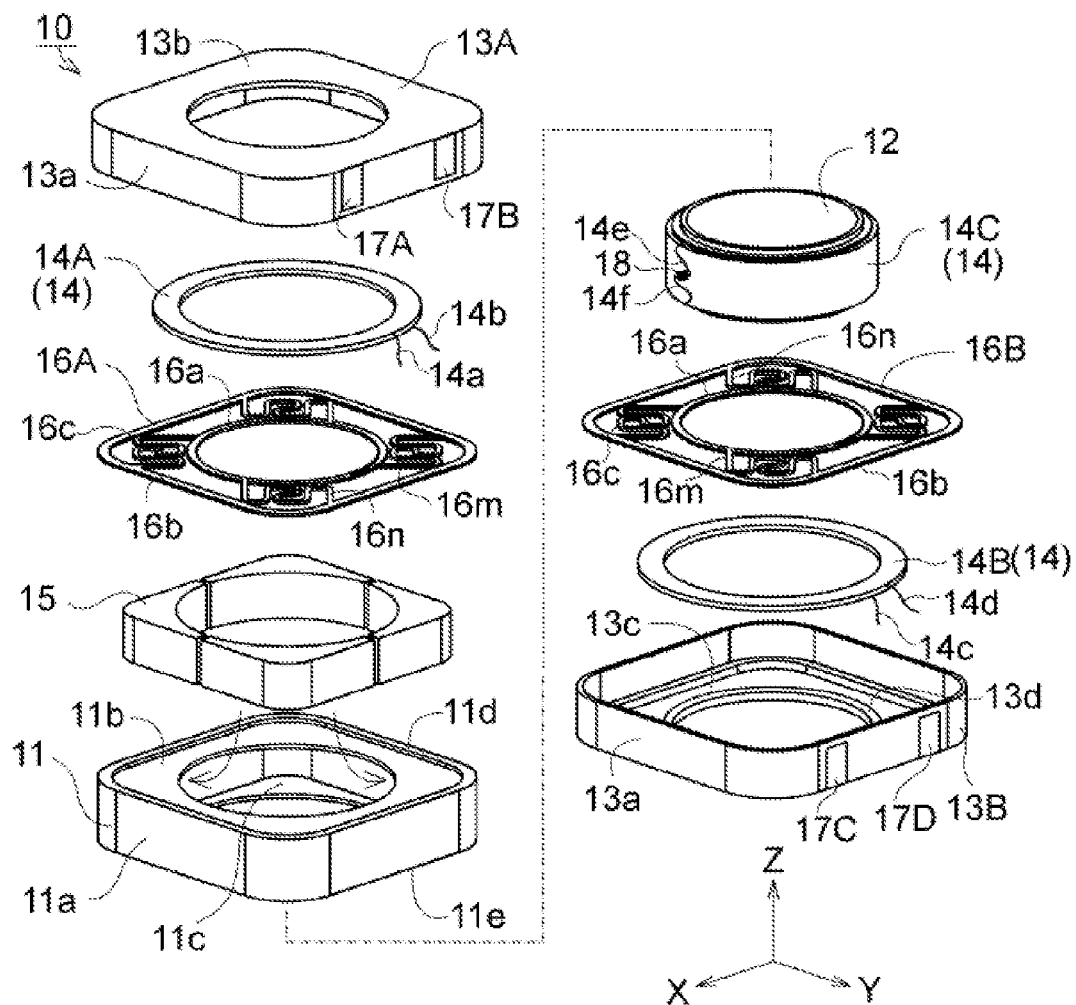
Figure 1B:
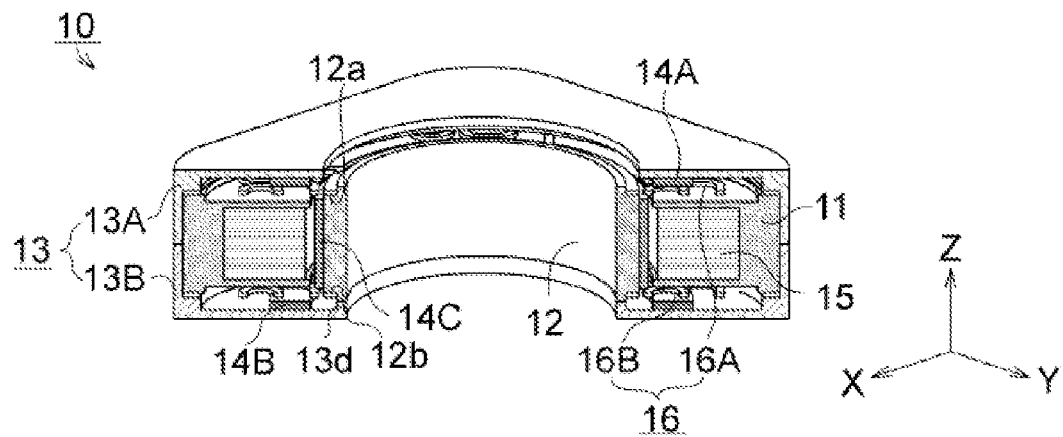

FIG. 1A is an exploded view illustrating the structure of a lens driving device 10 in the first embodiment, and FIG. 1B is a perspective cross section view of the lens driving device 10.

As shown in FIG. 1A and FIG. 1B, the lens driving device 10 includes a lens support 12 for retaining an unshown lens, a box body 13 arranged on the outer side of the lens support 12 and configured for accommodating and retaining the lens support 12 on the inner side, a driving coil 14 wound around the optical axis of the lens, a permanent magnet assembly 15 arranged on the inner side of the box body 13, two spring components 16 for supporting the lens support 12 in the box body 13 in a suspended mode and enabling the lens support 12 to move in the direction of the optical axis of the lens.

The lens support 12 is formed to be cylindrical, and an opening part of the lens support 12 faces the direction of Z axis. The unshown lens taking the direction of Z axis as the optical axis is retained on the inner peripheral side of the lens support 12.

Moreover, in the direction of the optical axis of the lens, the side of an object to be shot is set to be in the direction (in front) of +Z axis (+Z side), and the opposite side of the side of the object to be shot is set to be in the direction (at the rear) of −Z axis (−Z side). Moreover, the two directions respectively forming a right angle with the Z axis and forming a right angle with each other are taken as the direction of X axis and the direction of Y axis.

The driving coil 14 includes a front side primary coil 14A, a rear side primary coil 14B, and a secondary coil 14C mounted on the lens support 12 as a movable side. The front side primary coil 14A and the rear side primary coil 14B are mounted on the inner side of the box body as a fixed side.

The secondary coil 14C is mounted on the periphery of the lens support 12. The front side primary coil 14A and the rear side primary coil 14B are respectively mounted in front of the direction of Z axis of the secondary coil 14C and at the rear of the direction of Z axis of the secondary coil 14C. The front side primary coil 14A and the rear side primary coil 14B are coaxial to the secondary coil 14C mutually, and are wound around an axis parallel to the Z axis. The front side primary coil 14A and the secondary coil 14C are respectively arranged opposite to each other at an interval along the direction of the optical axis (direction of Z axis) in front of the lens support 12, and are combined with each other through electromagnetic induction (coupling through electromagnetic induction). Moreover, the rear side primary coil 14B and the secondary coil 14C are respectively arranged opposite to each other at an interval along the direction of the optical axis (direction of Z axis) in the rear of the lens support 12, and are combined with each other in an electromagnetic induction mode through electromagnetic induction. Moreover, as follows, the secondary coil 14C supplies the driving current from the outside to the front side primary coil 14A and the rear side primary coil 14B or one of the front side primary coil 14A and the rear side primary coil 14B via electromagnetic induction, and the front side primary coil 14A and the rear side primary coil 14B generate the secondary current by utilizing the electromagnetic induction.

The permanent magnet assembly 15 includes several permanent magnets, for example four magnets in the embodiment. Each permanent magnet is approximately triangular, and the inner peripheral sides of the four permanent magnets are correspondingly formed to be circular arc-shaped along with the lens support 12 and the outer peripheral surfaces of the secondary coil 14C. The four magnets of the permanent magnet assembly 15 are arranged in the box body 13 at the state of being accommodated in the four corners of a magnet support 11. The permanent magnet assembly 15 is disposed around the secondary coil 14C, so that the permanent magnet assembly 15 is arranged opposite to the secondary coil 14C at an interval along the radial direction (direction orthogonal to the optical axis, namely the direction of X axis and the direction of Y axis).

The cross section of the magnet support 11 is formed to be transverse n-shaped, and the permanent magnet assembly 15 is retained in the transverse n-shaped inner side of the magnet support 11. The magnet support 11 includes a square frame-shaped side wall part 11a, a plate-like top wall part 11b with a circular opening on the +Z side of the side wall part 11a, and a plate-like bottom surface part 11c with a circular opening on the −Z side of the side wall part 11a.

The spring component 16 is integrally formed into an annular plate spring, and is composed of a front side spring component 16A and a rear side spring component 16B. Each of the front side spring component 16A and the rear side spring component 16B includes a circular ring-shaped inner side retaining part 16a mounted on the side of the lens support 13, a square frame-shaped outer side retaining part 16b mounted on the side of the back side box body 13, several wrist parts 16c disposed between the inner side retaining part 16a and the outer side retaining part 16b and zigzagged along the circumference direction and the radial direction alternately, several inner side connecting parts 16m for connecting the inner side retaining part 16a with one ends of the wrist parts 16c, and several outer side connecting parts 16n for connecting the outer side retaining part 16b with the other ends of the wrist parts 16c. The spring component 16 is used for supporting the lens support 12 to be capable of moving in the direction of the optical axis in a suspended mode.

In more detail, the inner side retaining part 16a of the front side spring component 16A is fixed on the +Z side face of the connecting end 12a on the +Z side of the lens support 12, and the outer side retaining part 16b of the front side spring component 16A is fixed on the end part 11d on the +Z side of the side wall part 11a of the magnet support 11.

Moreover, the inner side retaining part 16a of the rear side spring component 16B is fixed on the −Z side face of the connecting end 12b on the −Z side of the lens support 12, and the outer side retaining part 16b of the rear side spring component 16B is fixed on the end part 11e on the −Z side of the side wall part 11a of the magnet support 11.

The box body 13 is composed of a front side box body 13A and a rear side box body 13B. The front side box body 13A includes: a square frame-shaped side wall part 13a, and a plate-like top wall part 13b defining a circular opening. The plate-like top wall part 13b is connected to the +Z side of the side wall part 13a. The rear side box body 13B includes: a square frame-shaped side wall part 13a, and a plate-like top wall part 13c defining a circular opening. The plate-like top wall part 13c is connected to the −Z side of the side wall part 13a. The front side primary coil 14A is mounted inside the front side box body 13A, and the rear side primary coil 14B is mounted inside the rear side box body 13B.

Moreover, the box body 13 can be non-magnetic, and can also be made of a soft magnetic material such as iron or ferrite according to requirements. By utilizing the soft magnetic material, the combination of electromagnetic conduction between the front side primary coil 14A, the rear side primary coil 14B and the secondary coil 14C can be improved, and the driving force can be effectively improved.

Thus, the front side primary coil 14A, the rear side primary coil 14B and the permanent magnet assembly 15 are retained in the box body 13 which is taken as the fixed side, and the secondary coil 14C is retained on the lens support 12 which is taken as the movable side.

Moreover, a limiting part 13d protruding upwardly (in the +Z direction) is arranged at the rim of the opening part of the rear side box body 13B. The limiting part 13d abuts against the −Z side end part of the lens support 12, and the spring component 16 is suspended at the state of being offset in the +Z direction. Thus, the lens support 12 is subjected to the restoring force in the −Z direction generated by the wrist parts 16c of the front side spring component 16A and the rear side spring component 16B, and is suspended in a weighted state all the time.

The driving current for driving the lens driving device 10 is supplied from the outside to the front side primary coil 14A and the rear side primary coil 14B respectively. Moreover, as follows, the secondary coil 14C is subjected to induction power supply along with the supply of the driving current so as to generate the secondary current.

Specifically, the winding terminals 14a, 14b of the front side primary coil 14A are connected with the power supply terminals 17A, 17B arranged in the front side box body 13A, and the winding terminals 14c, 14d of the rear side primary coil 14B are connected with the power supply terminals 17C, 17D arranged in the rear side box body 13B. Thus, the lens driving device 10 can be electrified from the outside. Moreover, a diode 18 used for enabling the secondary current to flow in a positive direction taken as the preset direction is connected between the winding terminals 14e and 14f, that is, the winding terminal 14e and the winding terminal 14f of the secondary coil 14C are connected with the two ends of the diode 18, respectively. And the two ends of the diode 18 are not connected with the power supply terminals 17A, 17B, 17C and 17D arranged on the side of the box body 13.

As shown in FIG. 2, the front side primary coil 14A and the rear side primary coil 14B are connected.

Figure 2A:
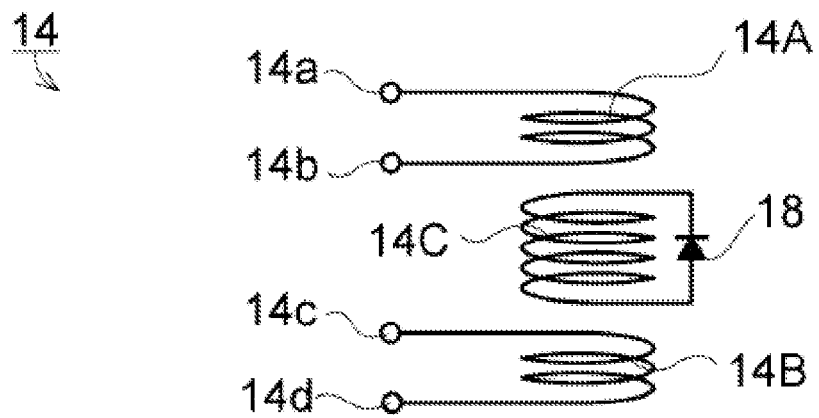

Specifically, as shown in FIG. 2A, for the purpose that the front side primary coil 14A and the rear side primary coil 14B are respectively and independently electrified, the winding terminal 14a of the front side primary coil 14A is connected onto the power supply terminal 17A (referring to FIG. 1), and the winding terminal 14b of the front side primary coil 14A is connected onto the power supply terminal 17B. The winding terminal 14c of the rear side primary coil 14B is connected onto the power supply terminal 17C, and the winding terminal 14d of the rear side primary coil 14B is connected onto the power supply terminal 17D.

Moreover, only one coil of the front side primary coil 14A and the rear side primary coil 14B is set, while the other coil is omitted, that is, the front side primary coil 14A or the rear side primary coil 14B and the secondary coil 14C form the driving coil 14.

Figure 2B:
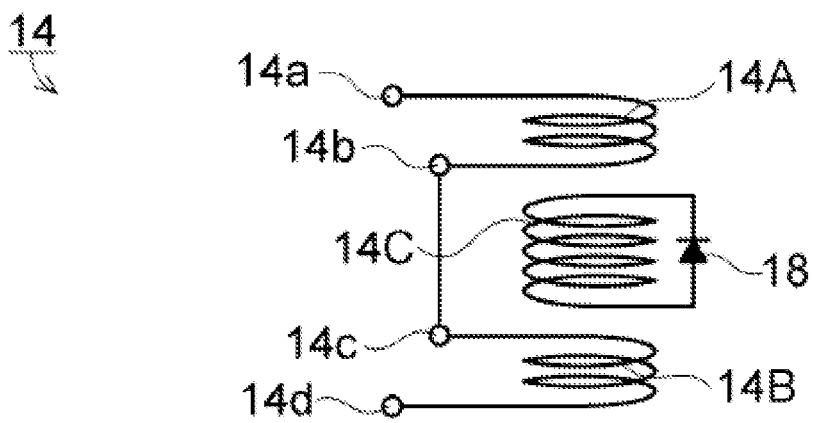

Moreover, as shown in FIG. 2B, the winding terminal 14b of the front side primary coil 14A can also be serially connected with the winding terminal 14c of the rear side primary coil 14B, the winding terminal 14a is connected with the power supply terminal 17C (referring to FIG. 1) of the rear side box body 13B, and the winding terminal 14d is connected with the power supply terminal 17D of the rear side box body 13B. Under this condition, the power supply terminals 17A, 17B arranged in the front side box body 13A can also be omitted.

Figure 2C:
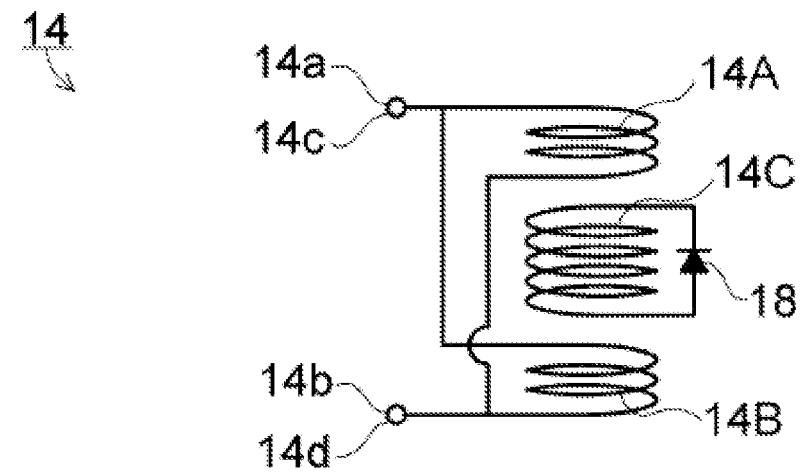

Moreover, as shown in FIG. 2C, the winding terminal 14a of the front side primary coil 14A is connected with the winding terminal 14c of the rear side primary coil 14B, and the winding terminal 14b of the front side primary coil 14A is connected with the winding terminal 14d of the rear side primary coil 14B. That is, the front and rear side primary coils 14A, 14B are connected in parallel. The winding terminals 14a, 14c can also be connected with the power supply terminal 17C (referring to FIG. 1) of the rear side box body 13B, and the winding terminals 14b, 14d can be connected with the power supply terminal 17D of the rear side box body 13B. Under this condition, the power supply terminals 17A, 17B arranged in the front side box body 13A can also be omitted.

When the primary current is supplied to at least one of the front side primary coil 14A and the rear side primary coil 14B of the lens driving device 10 formed like above, magnetic force lines corresponding to the energizing direction or quantity of the primary current are generated, and the magnetic force lines are crossed with the secondary coil 14C. Thus, the secondary current flows in the secondary coil 14C so as to counteract the changing of generated magnetic flux. Right now, because of the diode 18, the secondary current flowing in the secondary coil 14C flows only in the positive direction of the diode 18. Moreover, in the secondary coil 14C, a magnetic field from the permanent magnet assembly 15 disposed on the outer peripheral side is generated along the radial direction (direction orthogonal to the optical axis, namely direction of X axis and direction of Y axis).

Thus, based on the diode 18 with appropriately set polarity, the Lorentz force in the direction of +Z axis is generated in the secondary coil 14C, the Lorentz force generated by the secondary coil 14C enables the lens support 12 to move in the direction of Z axis until the lens support moves to a position that the Lorentz force is balanced with the restoring force generated by the wrist parts 16c of the spring component 16. Moreover, the primary current under this condition is the current capable of generating variable magnetic flux such as unipolar or bipolar pulse current or sine wave-shaped current.

As mentioned above, according to the lens driving device 10 of the present invention, the spring component 16 does not serve as a power supply path, the current does not need to be supplied to the secondary coil 14C mounted on the lens support 12, and thus the winding terminal 14e and the winding terminal 14f of the secondary coil 14C do not need to be connected with the spring component 16. Therefore, the tin soldering flux can be prevented from being scattered to be attached to the peripheral lens support 12 or spring component 16 in the tin soldering process, or the tin soldering flux is prevented from permeating in the gap between the lens support 12 and the box body 13, or the tin soldering flux is prevented from permeating in the gap between the lens support 12 and the spring component 16, or the tin soldering flux is prevented from permeating in the gap between the spring component 16 and the box body 13.

Moreover, the spring component 16 does not need to be heated through tin soldering iron or spot welding, the tin soldering flux can be effectively prevented from blocking the movement of the lens support 12 in the direction of Z axis, and the spring component 16 is prevented from degrading due to heating.

Moreover, the pressing of the tin soldering iron or spot welding head can be prevented from causing deformation of the spring component 16, as a result, the tin soldering flux generated in the tin soldering process can be prevented from permeating in the gaps among the lens support 12, the spring component 16 and the box body 13 to cause non-linear movement of the lens support 12, or the spring component 16 is prevented from degrading due to heating to cause that the spring coefficient changes, or the spring component 16 is prevented from being plastically deformed due to the pressing of the tin soldering iron or the spot welding head to cause that the lens support 12 is suspended in an inclined mode, and the lens support 12 suspended in an appropriate state accurately and linearly moves along the direction of the optical axis.

According to the lens driving device 10 of the present invention, the spring component 16 does not serve as a part of a power supply circuit, and thus the spring component 16 does not need to be an electro-conductive component. Therefore, the lens driving device 10 can be formed by using a spring component 116 as shown in FIG. 3.

Figure 3:
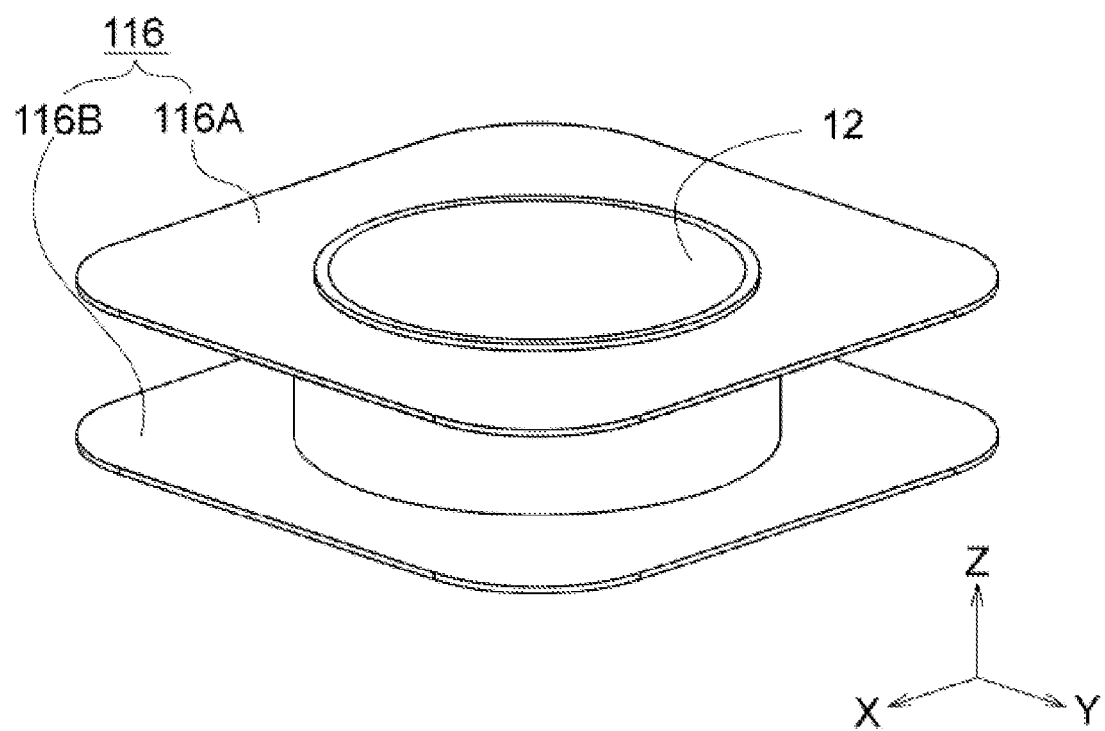
FIG. 3 is a perspective view of another spring component used by the lens driving device according to another example of the first embodiment of the present invention.

As shown in FIG. 3, a spring component 116 is made of a non-electro-conductive polymer material composed of rubber or plastic. The spring component 116 includes a front side spring component 116A and a rear side spring component 116B each of which is formed to be plate-like and is formed to be in the shape of a quadrangular plate defining a circular opening at the central part. Moreover, the edge defining the opening of the front side spring component 116A is connected to the front of the lens support 12, and the edge defining the opening part of the rear side spring component 116B is connected to the rear of the lens support 12.

Thus, in the present invention, power does not need to be supplied to the secondary coil 14C directly, and thus the spring component 16 as shown in FIG. 1 can be replaced by the spring component 116 using the non-electro-conductive polymer component. By adopting the spring component 116, a material with the ratio of expansion and contraction or curving curvature greater than that of components made of metal or alloy can be selected, and thus the plastic deformation such as buckling caused by falling or impacting is difficult to appear.

Figure 4A:
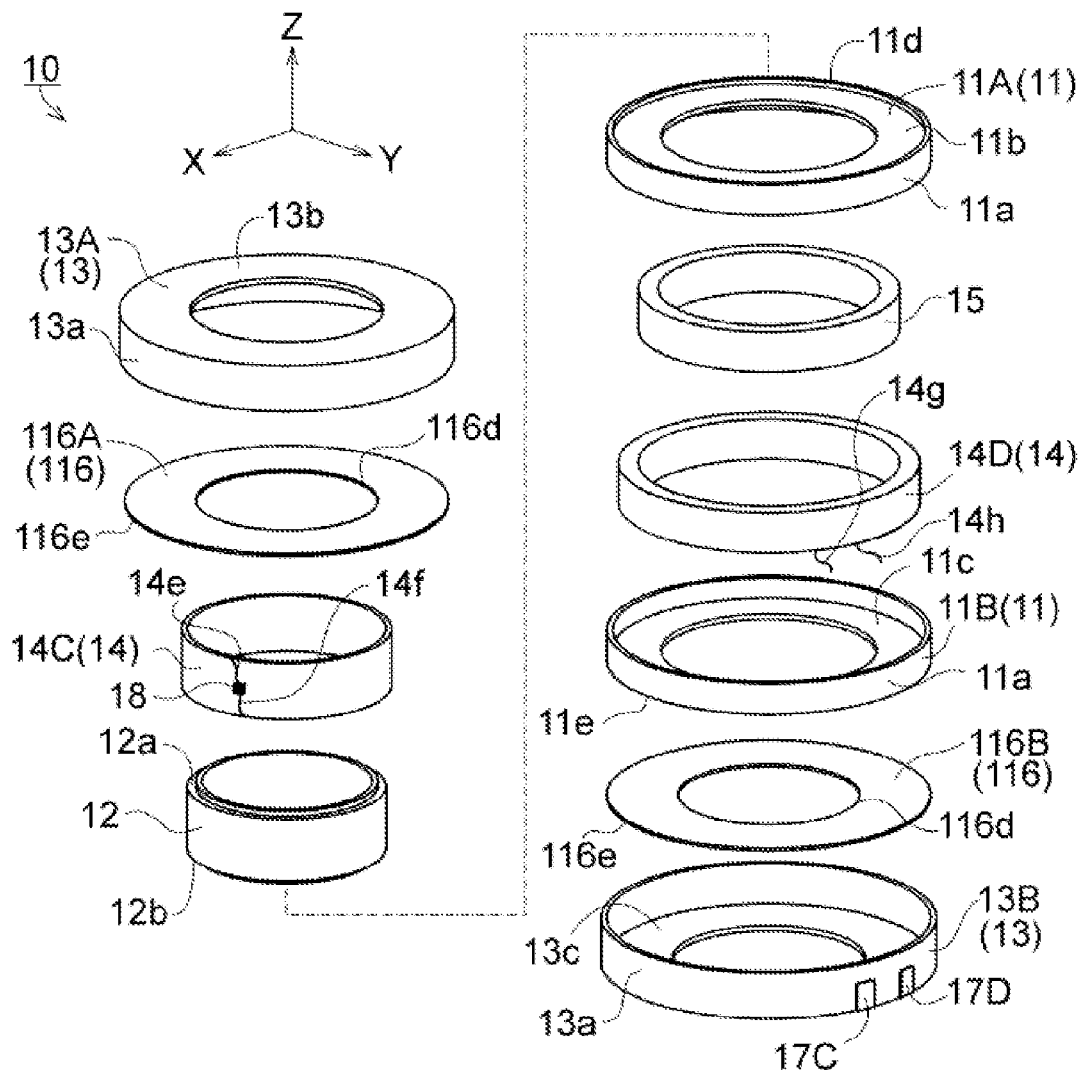
FIG. 4A is an exploded view and FIG. 4B is a cross-sectional view of a lens driving device in according to a second embodiment of the present invention.
Figure 4B:
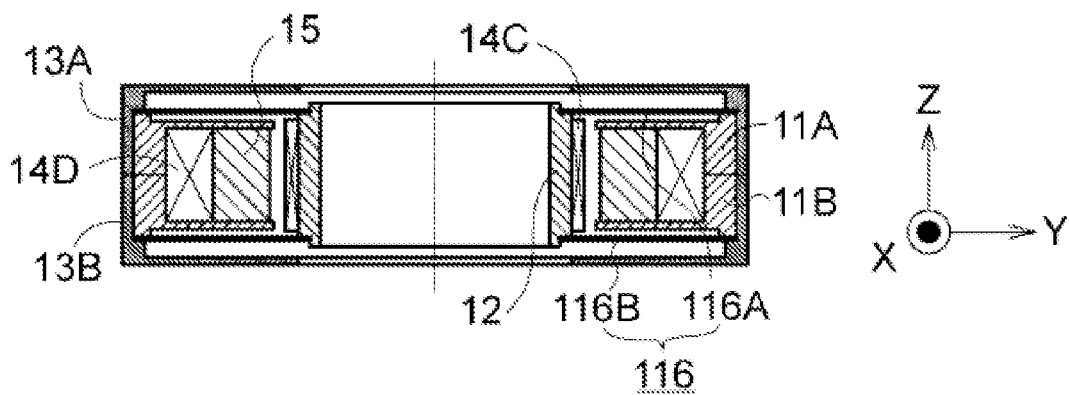
Figure 5:
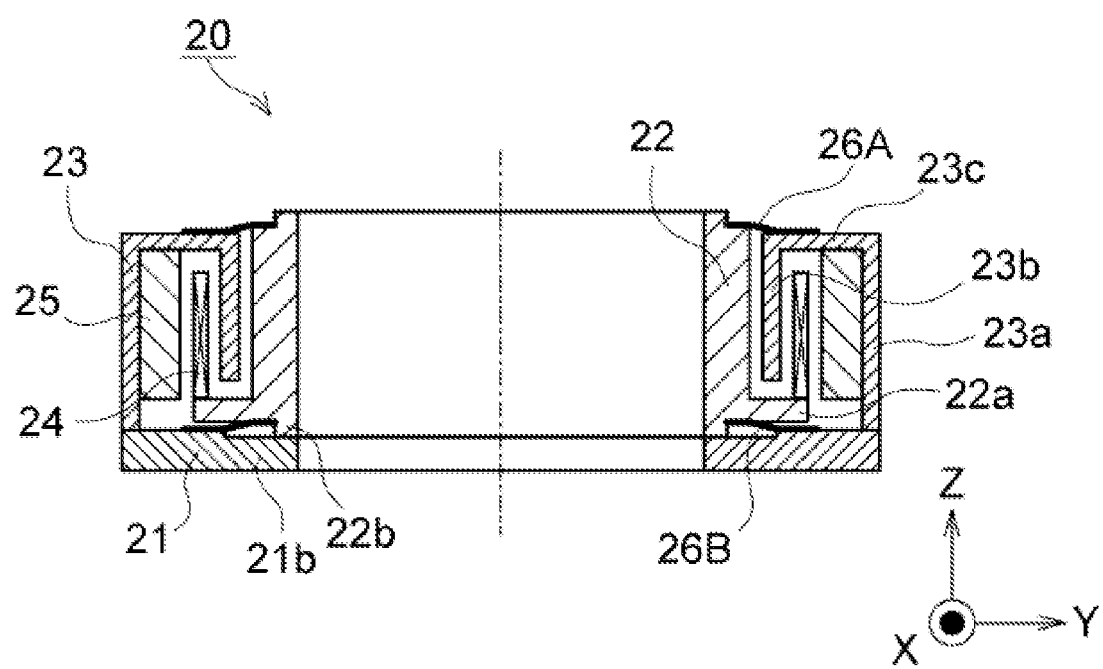
FIG. 5 is a cross-sectional view of an existing lens driving device.
Figure 6A:
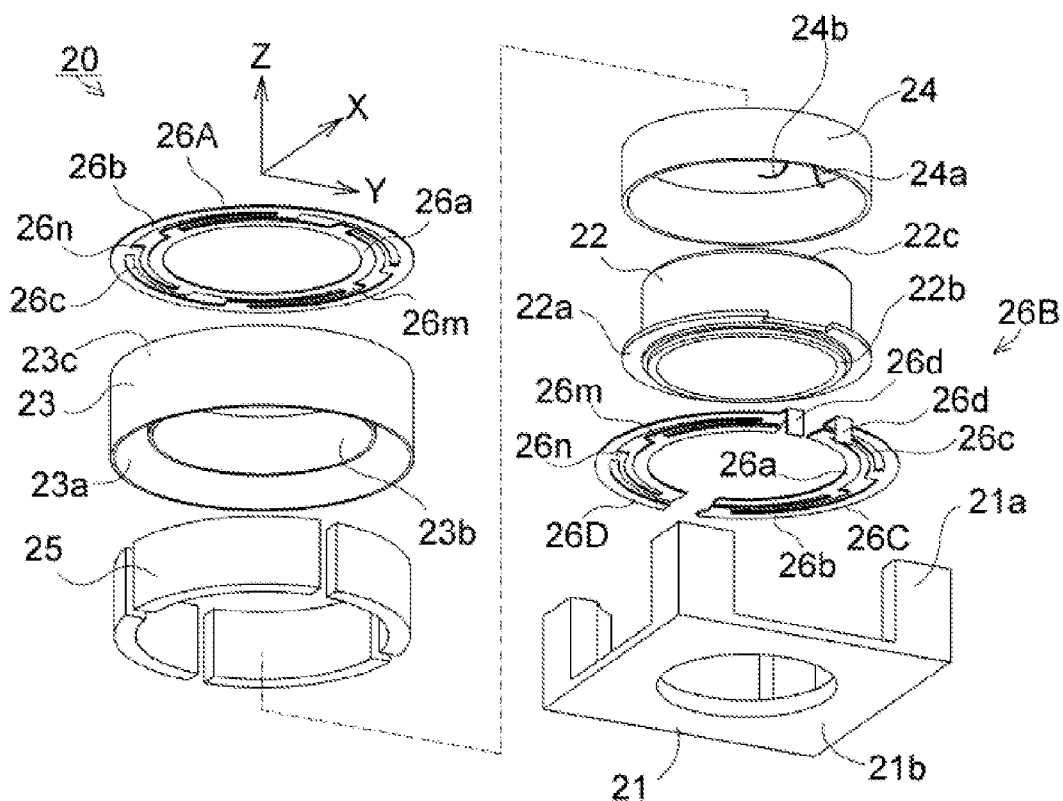
FIG. 6A is an exploded view illustrating the existing lens driving device and FIG. 6B is a perspective view illustrating the main parts of the existing lens driving device.
Figure 6B:
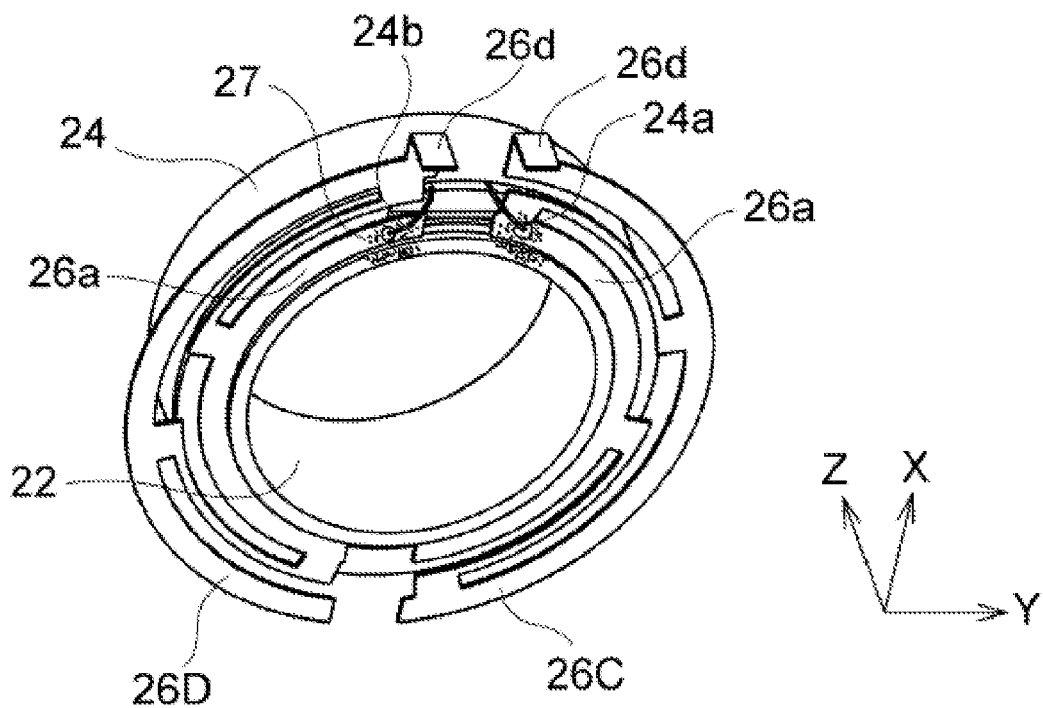

FIG. 4A is an exploded view and FIG. 4B is a section view illustrating the lens driving device 10 in the second embodiment of the present invention. The lens driving device 10 includes a lens support 12 for retaining an unshown lens, a box body 13 arranged on the outer side of the lens support 12 for accommodating and retaining the lens support 12 on the inner side, a driving coil 14 wound around the optical axis of the lens, a permanent magnet assembly 15 arranged on the inner side of the box body 13, a spring component 116 for supporting the lens support 12 in the box body in a suspended mode and enabling the lens support 12 to move in the direction of the optical axis of the lens.

The lens support 12 is formed to be cylindrical and having an opening part facing the direction of Z axis, and the unshown lens taking the direction of Z axis as the optical axis is retained on the inner peripheral side of the lens support 12.

The driving coil 14 includes an outer side primary coil 14D arranged on the inner side of the box body 13 and a secondary coil 14C mounted on the periphery of the lens support 12. The outer side primary coil 14D is arranged on the outer side of the permanent magnet assembly 15 and is mounted on the magnet support 11, namely on the side of the box body 13. The outer side primary coil 14D and the secondary coil 14C are coaxial, and are all wound around the axis parallel to the Z axis. The secondary coil 14C is mounted on the outer peripheral side of the lens support 12. The permanent magnet assembly 15 is disposed on the outer diameter side of the secondary coil 14C as mentioned below, and are arranged opposite to the secondary coil 14C at an interval along the radial direction (X direction, Y direction). The outer side primary coil 14D is disposed on the outer diameter side of the permanent magnet assembly 15, and both of them are mounted on the magnet support 11 together. Moreover, the driving current is supplied from the outside to the outer side primary coil 14D, so that electromagnetic conduction occurs on the outer side primary coil 14D, and thus the secondary current is generated in the secondary coil 14C.

The permanent magnet assembly 15 is formed to be circular ring-shaped, is disposed around the secondary coil 14C, and is arranged opposite to the secondary coil 14C at an interval along the radial direction (X-axis direction, Y-axis direction). It is understandably, the permanent magnet assembly 15 could also be a magnet assembly having several magnets.

The magnet support 11 is circular ring-shaped, and is composed of a front side magnet support 11A and a rear side magnet support 11B. The front side box body 11A includes a circular ring-shaped side wall part 11a, and a plate-like top wall part 11b defining a circular opening. The plate-like top wall part 11b is connected to the +Z side of the side wall part 11a. The rear side box body 11B includes a circular ring-shaped side wall part 11a, and a plate-like top wall part 11c defining a circular opening. The plate-like top wall part 11c is connected to the −Z side of the side wall part 11a. Moreover, the permanent magnet assembly 15 and the outer side primary coil 14D are clamped by the front side magnet support 11A and the rear side magnet support 11B in the front-and-back direction of the direction of Z axis.

The spring component 116 includes a front side spring component 116A and the rear side spring component 116B each formed to be a circular ring-shaped plate spring and is made of a freely telescopic non-electro-conductive polymer material such as rubber or plastic. Moreover, the respective inner peripheral parts 116d of the front side spring component 116A and the rear side spring component 116B are mounted on the side of the lens support 12, and the respective outer peripheral parts 116e of the front side spring component 116A and the rear side spring component 116B are mounted on the side of the box body 13. The spring component 116 is used for supporting the lens support 12 to be capable of moving in the direction of Z axis in the suspended mode.

In more detail, the inner peripheral part 116d of the front side spring component 116A is fixed on the +Z side face of the connecting end 12a on the +Z side of the lens support 12, and the outer peripheral part 116e is fixed on the end part 11d on the +Z side of the side wall part 11a of the front side magnet support 11A.

Moreover, the inner peripheral part 116d of the rear side spring component 116B is fixed on the −Z side face of the connecting end 12b on the −Z side of the lens support 12, and the outer peripheral part 116e of the rear side spring component 116B is fixed on the end part 11e on the −Z side of the side wall part 11a of the rear side magnet support 11B.

The box body 13 is composed of the front side box body 13A and the rear side box body 13B, and are formed to be circular rings-shaped respectively. The front side box body 13A includes: a circular ring-shaped side wall part 13a, and a plate-like top wall part 13b defining a circular opening and connected to the +Z side of the side wall part 13a. The rear side box body 13B includes: a circular ring-shaped side wall part 13a, and a plate-like top wall part 13c defining a circular opening and connected to the −Z side of the side wall part 13a. The magnet support 11 is clamped from its +Z side and the −Z side by the box body 13 composed of the front side box body 13A and the rear side box body 13B.

Moreover, the box body 13 can be non-magnetic, and can also be made of a soft magnetic material such as iron or ferrite according to requirements. By adopting the soft magnetic material, the electromagnetic induction bonding force between the outer side primary coil 14D and the secondary coil 14C can be improved, and the driving efficiency can be improved.

Thus, the permanent magnet assembly 15 and the outer side primary coil 14D of the driving coil 14 are all retained on the side of the box body 13 as the fixed side, and the secondary coil 14C is retained on the side of the lens support 12 as the movable side. Moreover, the spring component 116 is used for suspending the lens support 12 freely and enabling the lens support 12 to move in the +Z direction and the −Z direction respectively.

The driving current for driving the lens support 10 is supplied from the outside to the outer side primary coil 14D. Moreover, as follows, the secondary coil 14C generates induction power supply along with the supply of the driving current so as to generate the secondary current.

Specifically, the winding terminals 14g, 14h of the outer side primary coil 14D are connected with the power supply terminals 17C, 17D of the rear side box body 13B, and can be electrified from the outside. Moreover, the winding terminal 14e and the winding terminal 14f of the secondary coil 14C are serially connected with the two ends of the diode 18 respectively. The diode 18 is used for enabling the secondary current to flow in the positive direction taken as the preset direction. The two ends of the diode 18 are not connected with the power supply terminals 17C and 17D arranged on the side of the box body 13.

When the primary current is supplied to the outer side primary coil 14D of the lens driving device 10 in the second embodiment, magnetic force lines corresponding to the energizing direction or quantity of the primary current are generated, and the magnetic force lines are crossed with the secondary coil 14C. Thus, the secondary current flows in the secondary coil 14C so as to counteract the changing of the crossed magnetic flux. Right now, because of the diode 18, the secondary current flowing in the secondary coil 14C flows only in the positive direction of the diode 18. Moreover, in the secondary coil 14C, a magnetic field from the permanent magnet assembly 15 disposed on the outer peripheral side is generated along the radial direction (direction orthogonal to the optical axis, namely direction of X axis and direction of Y axis). Therefore, according to the connecting polarity of the diode 18, the Lorentz force in the direction of +Z axis or the −Z direction is generated in the secondary current, and the lens support 12 can move in the direction of +Z axis or the −Z direction until the lens support moves to a position that the Lorentz force is balanced with the restoring force generated by the telescopic elasticity of the spring component 116.

Moreover, the primary current is the current capable of generating variable magnetic flux such as unipolar or bipolar pulse current or sine wave-shaped current.

Thus, according to the lens driving device 10 in the second embodiment, the winding terminal 14e and the winding terminal 14f of the secondary coil 14C do not need to be connected with the spring component 116. Therefore, the tin soldering flux can be prevented from being scattered to be attached to the peripheral lens support 12 or spring component 116 in the tin soldering process, or the tin soldering flux is prevented from permeating in the gap between the lens support 12 and the box body 13, or the tin soldering flux is prevented from permeating in the gap between the lens support 12 and the spring component 116, or the tin soldering flux is prevented from permeating in the gap between the spring component 116 and the box body 13.

Moreover, the spring component 116 does not need to be heated through tin soldering iron or spot welding, the tin soldering flux can be effectively prevented from blocking the movement of the lens support 12 in the direction of Z axis, and the spring component 116 is prevented from degrading due to heating.

Moreover, the pressing of the tin soldering iron or spot welding head can be prevented from causing deformation of the spring component 116, as a result, the tin soldering flux generated in the tin soldering process can be prevented from permeating in the gaps among the lens support 12, the spring component 116 and the box body 13 to cause non-linear movement of the lens support 12, or the spring component is prevented from degrading due to heating to cause that the spring coefficient changes, or the spring component 116 is prevented from being plastically deformed due to the pressing of the tin soldering iron or the spot welding head to cause that the lens support 12 is suspended in an inclined mode, and the lens support 12 suspended in an appropriate state accurately and linearly moves along the direction of the optical axis.

While the invention has been described in terms of several exemplary embodiments, those skilled on the art will recognize that the invention can be practiced with modification within the spirit and scope of the appended claims. In addition, it is noted that, the Applicant's intent is to encompass equivalents of all claim elements, even if amended later during prosecution.

What is claimed is:

1. A lens driving device, comprising:
   a lens support for retaining a lens;
   a box body for accommodating the lens support;
   a spring component for supporting the lens support in the box body in a suspension mode in a direction of an optical axis of the lens;
   at least one primary coil wound around the optical axis and mounted on an inner side of the box body;
   a secondary coil coaxial to the at least one primary coil, wound around the optical axis and mounted on an outer peripheral side of the lens support;
   a permanent magnet or a permanent magnet assembly arranged on the inner side of the box body and arranged opposite to the secondary coil at an interval along a radial direction of the lens; and
   a diode with its two ends connected with two coil terminals of the secondary coil respectively;
   wherein the connected diode and the secondary coil form a closed-loop circuit, and electromagnetic induction is generated along with a supply of a driving current to the at least one primary coil, so that a secondary current is generated in the secondary coil based on the electromagnetic induction, and the diode serially connected between the two coil terminals of the secondary coil enables the secondary current to flow in a preset direction.

2. The lens driving device of claim 1, wherein there are two primary coils, the two primary coils and the secondary coil are configured opposite to each other at an interval along the direction of the optical axis.

3. The lens driving device of claim 1, wherein there is one primary coil, and the primary coil and the secondary coil are configured opposite to each other at an interval along the radial direction.

4. The lens driving device of claim 2, wherein there is one primary coil, and the primary coil and the secondary coil are opposite to each other at an interval along the radial direction.

* * * * *